Figure 6:
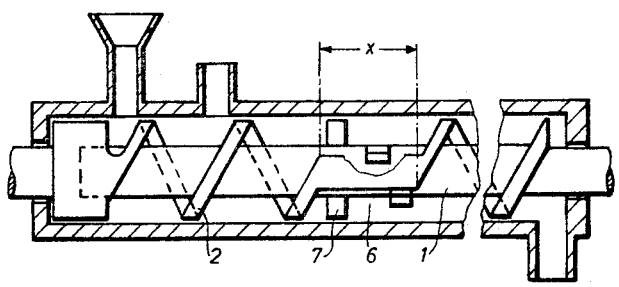

Aug. 30, 1966   K. LEISTER   3,269,708
CONTINUOUSLY OPERATING MACHINE FOR
MIXING AND/OR REACTING MATERIALS
Filed Nov. 16, 1964   2 Sheets-Sheet 1
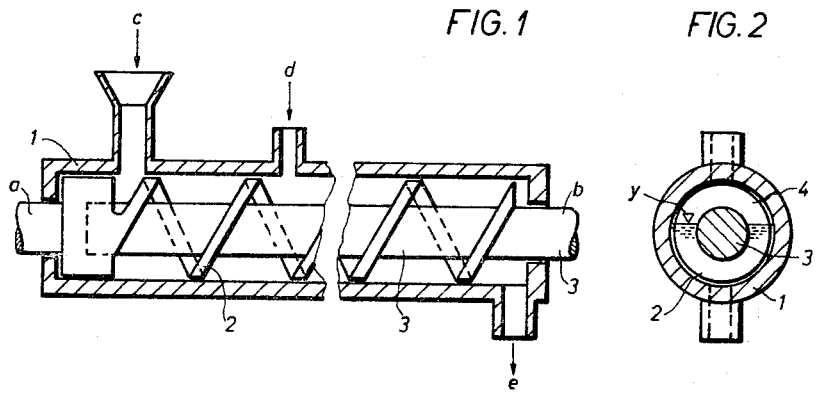
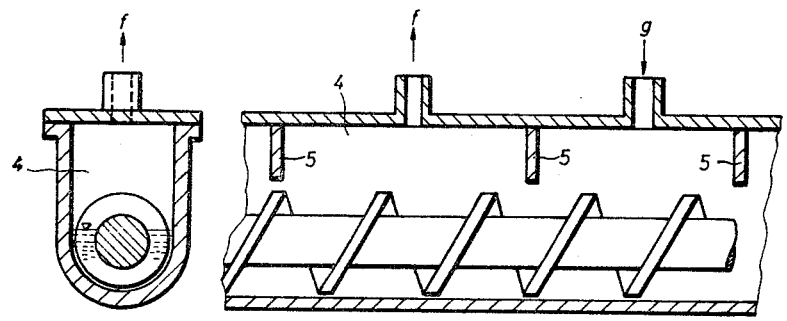
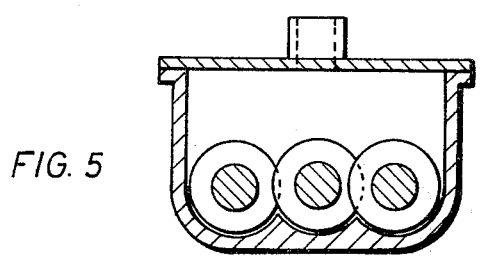
INVENTOR.
KARL LEISTER
BY
ATTORNEY Aug. 30, 1966 K. LEISTER 3,269,708
CONTINUOUSLY OPERATING MACHINE FOR
MIXING AND/OR REACTING MATERIALS
Filed Nov. 16, 1964 2 Sheets-Sheet 2

INVENTOR.
KARL LEISTER
BY
*Burgess, Dinklage & Sprung*
ATTORNEY 3,269,708
CONTINUOUSLY OPERATING MACHINE FOR
MIXING AND/OR REACTING MATERIALS
Karl Leister, Krefeld-Bockum, Germany, assignor to Farbenfabriken Bayer Aktiengesellschaft, Leverkusen, Germany, a corporation of Germany
Filed Nov. 16, 1964, Ser. No. 411,235
Claims priority, application Germany, Nov. 23, 1963,
F 41,346
5 Claims. (Cl. 259—6)

The invention relates to worm machines for the continuous carrying out of mixing and chemical reactions, which can handle liquid, solids or gaseous components, in which machines the mixing and transporting of the materials present can be altered independently of one another, whilst maintaining the residence times within very narrow limits, i.e. substantially avoiding remixture of the continuously moving stream of product.

All hitherto known mixing and kneading machines equipped with conveyor worms for carrying out such processes and designed to avoid remixing are characterized in that the intensity of their mixing effect depends on the speed of rotation of the worm shafts, i.e. it is limited by the output of the latter. The same applies especially to intermeshing multiple worms, as in single-spindle worms considerable remixing occurs, depending in extent on the amount of slack, which leads to an increase in the range of residence times. This can have a deleterious effect on very sensitive products.

Although the mixing effect of such worm machines can be increased by the incorporation of backflow screw threads or the like, basically it still depends on the speed of rotation of the worm, i.e. any decrease in the output of the worm is accompanied by a diminutation in the mixing effect. It is thus impossible in such machines to increase the mixing effect and at the same time reduce the output.

These disadvantages are avoided in the machine according to the invention by separating the core of the worm and the screw threading of the worm from each other and driving them independently of each other. Thus, for example, the core of the screw can rotate at a very high peripheral speed for the purpose of intensive mixing while the thread is stationary or driven at low speeds of rotation for very slow conveyance of the stream of product. By equipping the core with suitable grooves or mixing devices and by providing it with a separate drive, e.g. by way of variable speed gearings, the mixing effect can be adjusted independently of the output of the thread whilst the speed of rotation of the thread determines the residence time of the stream of product.

Embodiments of the invention are illustrated schematically in the accompanying drawings.

According to FIG. 1, a continuously operating mixing and reaction worm consists of a cylindrical housing 1 which contains a thread 2 and a core 3 which are driven separately at $a$ and $b$ respectively. FIG. 2 shows a cross-section through the machine. The components to be mixed or the reaction products enter at $c$ or $d$ and leave at $e$.

The mixing worm can be operated in such a manner that the inside space is completely filled with liquid. Alternatively, the liquid level may lie, for example, at $y$ (FIG. 2). In the latter case, the threads form liquid chambers separated from each other and only partly filled, with vapour spaces 4. In each liquid chamber, the mixing effect is produced by the core 3 while the spirals of the thread separate the liquid content of the different chambers and convey it successively to the outlet, thus preventing remixing.

It is also possible to provide a vapor chamber as shown in FIGS. 3 and 4 the large quantities of gas or vapour have to be removed from the reaction mixture. It may be subdivided by partitions 5, for example, in order to remove the vapours and gases at $f$ by suction while the condensates of the vapours or other liquids required, for example for washing or extraction, are supplied at $g$.

Figure 7:
Figure 8:
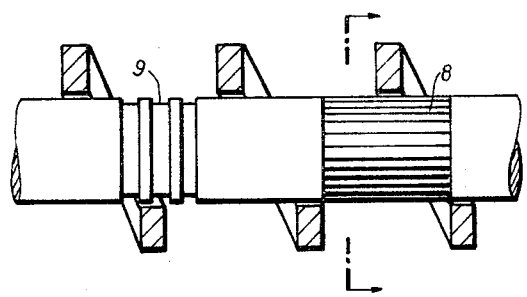
Figure 9:
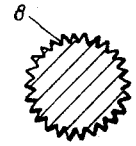

Another possibility of increasing the mixing effect is indicating in FIGS. 6 and 7 where the thread is replaced along the length $x$ by webs 6 so that in this position the core of the worm can be equipped with additional mixing devices 7. The same purpose is served by the longitudinal grooves 8 or transverse grooves 9 worked at intervals into the core of the worm over its whole length as shown in FIGS. 8 and 9.

It is also possible to arrange several worms in known manner side by side, in which case the worm threads and the worm cores are driven separately from each other (FIG. 5).

As can be appreciated by the artisan, the mixing apparatus of the invention has a housing 1 having an inlet $c$ (and also $d$) for introducing materials to be subjected to mixing treatment and an outlet $e$ for discharging mixed materials. The worm thread member 2 is disposed within the housing 1 for rotation relative thereto so as to convey materials undergoing progressive mixing therein from the inlet $c$, $d$, to the outlet 3. The worm core member 3 is also rotatable relative to the housing and relative to the worm thread member 2 and serves for mixing the materials conveyed by the worm thread member 2. The worm core member 3 is disposed for coaxial rotation within the worm thread member 2 and has an external diameter substantially equal to the internal diameter of the worm thread member 2 so that said worm thread member wipes the exterior surface of the worm core member 3 as the two are rotated independently.

This is advantageous because the materials undergoing progressive mixing by reason of the rotating worm core member 3 are conveyed toward the outlet $e$ by the worm thread member 2 without any significant intermixing of materials conveyed by adjoining convolution of the worm thread member 2. By eliminating axial direction intermixing, a uniform mixing residence time can be maintained for the mixed material product discharged at the outlet $e$.

I claim:
1. A mixing apparatus which comprises a housing having an inlet for introducing materials to be subjected to mixing treatment and an outlet for discharging mixed materials, a worm thread member disposed within said housing for rotation relative thereto for conveying materials mixed therein from the inlet to the outlet thereof, and a worm core member disposed within said housing for rotation relative thereto, and disposed within said worm thread member for coaxial rotation relative thereto for mixing materials conveyed by said worm thread member, said worm core member having an external diameter substantially equal to the internal diameter of the worm thread member for wiping engagement therewith whereby materials progressively mixed by the rotation of the worm core member are conveyed from the inlet to the outlet by the worm thread member substantially without intermixing of materials conveyed by adjoining convolutions of the worm thread member to maintain a uniform mixing residence time of the mixed material product discharged at the outlet.

2. The apparatus according to claim 1 wherein said worm thread and worm core members are disposed for rotation in the same direction.

3. The apparatus according to claim 1 wherein said worm thread and worm core members are disposed for rotation in opposite directions.

4. The apparatus according to claim 1 wherein said worm thread member has at least one interrupting web member.

5. The apparatus according to claim 1 wherein said worm core member has at least one groove recessed into the exterior surface thereof to aid the material mixing action thereof.

References Cited by the Examiner

UNITED STATES PATENTS

| | | |
|---|---|---|
| 2,020,878 | 11/1935 | Doering. |
| 2,957,681 | 10/1960 | Moultrie _____ 259—105 |
| 3,194,504 | 7/1965 | Entrikin _____ 259—105 X |

WILLIAM I. PRICE, *Primary Examiner.*